United States Patent Office 3,285,875
Patented Nov. 15, 1966

3,285,875
CURABLE AND CURED HIGH MOLECULAR WEIGHT POLYCARBONATES AND PROCESS FOR THE PRODUCTION THEREOF
Ludwig Bottenbruch, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Filed Jan. 12, 1960, Ser. No. 1,865
Claims priority, application Germany, Jan. 15, 1959, F 27,474
16 Claims. (Cl. 260—47)

Curable and cured high molecular weight polycarbonates and process for the production thereof.

The present invention relates to new, curable and cured, high molecular weight polycarbonates and to a process for producing them.

It is known to react aromatic polyhydroxy compounds especially dihydroxy compounds, such as hydroquinone, resorcinol, dihydroxydiphenyl, dihydroxy-diaryl-alkanes, -ethers, -sulphides, -sulphones, -sulphoxides, and -ketones, in a molar ratio of 1:2 with, for example, alkenyl chlorocarbonic acid esters to give the corresponding bis-alkenyl carbonates of the dihydroxy compounds. These unsaturated bis-carbonates are polymerisable by heating and possibly under the influence of catalysts and thus are curable. As a result of their very close cross-linking, the polymerization products are very brittle since each carbonic acid group corresponds to a polymerizable group.

On the other hand, the highly polymeric linear polycarbonates which are obtained by the reaction of aromatic dihydroxy compounds of the type mentioned, optionally in admixture with an aliphatic or cycloaliphatic dihydroxy compound, with derivatives of carbonic acid, especially diesters and phosgene, in a molar ratio of about 1:1 are thermoplastic, i.e., they are not hardenable. As such, they have very good properties for many fields of application but in other fields of application, for example, for the production of molded articles, for use as binding agents and cements, and especially in lacquer technology where curable synthetic plastics are frequently preferred, these thermoplastic polycarbonates are less suitable. For their use as raw materials for lacquers, it must be particularly remembered that only comparatively dilute lacquer solutions can be prepared because of their high solution viscosity.

With the present invention, the gap which exists between the previously known curable monomeric and the noncurable, linear highly polymeric polycarbonates is filled. The advantageous properties of the latter, especially the hardness and elasticity, the low absorption of water, the high resistance to saponification and the resistance to many chemicals, remains substantially unaltered.

One object of the present invention is to provide curable, linear, high molecular weight polycarbonates the chains of which have the following formula I;

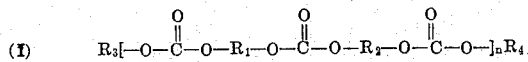

wherein
$R_1$ and $R_2$ are divalent radicals such as alkylene, cyclo- alkylene, bis-alkylene phenyl, bis-(alkylene-oxy)- phenyl, and arylene radicals,
$R_3$ and $R_4$ are monovalent radicals such as alkyl, cycloalkyl, aralkyl, aryl, alkaryl, hydroxyalkyl, hydroxy cycloalkyl, hydroxy aralkyl, monooxalkylated hydroxy aryl, hydroxy aryl and hydroxy alkaryl radicals,
at least part of $R_1$, $R_2$, $R_3$ and $R_4$ being one of the radicals of the general Formulae II to VII

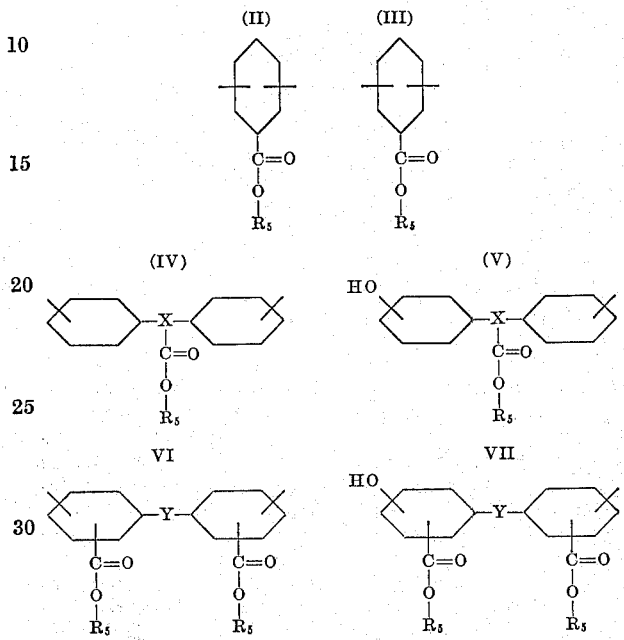

wherein
$R_5$ is a monovalent radical such as methyl, ethyl, propyl, isopropyl, butyl, isobutyl, pentyl, hexyl, cyclopentyl, cyclohexyl, and phenyl.
X is a methylene derivative and
Y is a radical such as methylene and a methylene derivative, the ester groups forming side-chains in Formula I mentioned above and
$n$ is a whole number greater than 5.

Particularly, $R_1$ and $R_2$ may be, for instance, butylene, pentylene, hexylene, di-, tri- and polyoxyethylene, cyclopentylene, cyclohexylene, zylylene, bis-ethoxy and bis-propoxy phenylene and diphenylene, phenylene, diphenylene, naphthylene, and especially diphenylene alkanes, such as diphenylene methane, ethane, propane, butane, pentane, cyclohexyne, furthermore diphenylene ethers, sulphides, sulphones and sulphoxides.

$R_3$ and $R_4$ may be, for instance, methyl, ethyl, propyl, isopropyl, butyl, isobutyl, pentyl, hexyl, cyclopentyl, cyclohexyl, toluyl, xylyl, isobutyl phenyl phenyl, naphthyl, phenyl ethyl, phenyl propyl, phenyl isopropyl, phenyl butyl, phenyl isobutyl, hydroxy ethyl, hydroxy propyl, hydroxy isopropyl, hydroxy butyl, hydroxy isobutyl, hydroxy pentyl, hydroxy hexyl, hydroxy cyclopentyl, hydroxy cyclohexyl, hydroxy ethyl phenyl, hydroxy propyl phenyl, hydroxy isopropyl phenyl, hydroxy butyl phenyl, hydroxy isobutyl phenyl, monooxethylated and monooxpropylated phenyl, hydroxy phenyl, hydroxy toluyl, hydroxy xylyl, hydroxy phenyl ethyl, hydroxy phenyl propyl, hydroxy

EXAMPLE II

Injection moulding silicon

A silicon injection moulding mix is prepared as in Example I from the following ingredients:

| | G. |
|---|---|
| Silicon powder (−300 BSS mesh) | 365 |
| "Carbowax" 6000 | 89 |
| "Epolene" LV | 44 |

The weights of the two binder ingredients used give, at the moulding temperature, a binder volume equal to 105% of the total volume of the voids which would be present between the ceramic particles in the absence of other ingredients.

Test bars 2½" long by ¼" square are injection moulded as in Example I, and on heating to remove the binder, there is no deformation, and the edges and corners are as sharp and well-defined as they were before the heating process.

The binder having been removed, the silicon can be converted to silicon nitride by the usual processes.

EXAMPLE III

Injection moulding a zircon-silica body

The mix is prepared as in Example I from the following:

| | G. |
|---|---|
| Zirconium silicate, −200 BSS mesh | 820 |
| Fused silica, −200 BSS mesh | 205 |
| Carbowax 6000 | 103 |
| Epolene LV | 35 |
| Tritolyl phosphate | 5 |

The weights of the two binder ingredients used give, at the moulding temperature, a binder volume equal to 105% of the total volume of the voids which would be present between the ceramic particles in the absence of other ingredients.

The compound was injection moulded to make bars 4" long x 1" wide x ⅛" thick. These were fired to 1280° C. to give the required porous compact of the following properties:

| | |
|---|---|
| Modulus of rupture, lb./in. | 950 |
| Density, g./cm. | 2.52 |
| Apparent porosity, percent | 34 |
| Firing contraction (linear), percent | 0.7 |

EXAMPLE IV

Yield point

Pieces 4" long x 1" wide x ⅛" thick were injection moulded from the two mixes given below:

MIX 1

| | Parts by volume |
|---|---|
| Zirconium silicate, −200 BSS mesh | 45 |
| Fused silica, −200 BSS mesh | 23 |
| Carbowax 6000 | 32 |

MIX 2

| | |
|---|---|
| Zirconium silicate, −200 BSS mesh | 45 |
| Fused silica, −200 BSS mesh | 23 |
| Carbowax 6000 | 23.5 |
| Epolene LV | 8.5 |

Pieces made from these mixes were placed vertically, resting on the 4" x ⅛" face, and fired to 1280° C. During the stage at which the binder was molten before it volatilized, the pieces made in Mix 1 "slumped" on the batt to a shapeless mass, but pieces made from Mix 2 did not distort to any measurable extent.

The products of the invention are of particular use, for example, in the moulding of electrical insulating bodies, semi-conductors, cores for metal casting which are removable by chemical or mechanical means, pottery, and porous ceramic products.

I claim:

1. A mouldable material containing a ceramic composition in particle form mixed with a binder; said binder comprising a polyethylene glycol and at least one polyolefin, with the volume of said binder being at least 102% of the ceramic material void volume at moulding temperatures.

2. A mouldable material according to claim 1 in which polyethylene is the polyolefin.

3. A mouldable material according to claim 1 in which the binder volume ranges from 102% to 115% of the void volume.

4. A mouldable material according to claim 2 wherein the binder volume ranges from 102% to 115% of the void volume.

5. A mouldable material according to claim 3 wherein the binder comprises between 8 parts and 30 parts by weight of polyolefin per 100 parts by weight of polyethylene glycol/polyolefin mixture.

6. A mouldable material according to claim 3 in which the amount of binder present is between 30% and 60% by volume of the mouldable material.

7. A mouldable material according to claim 6 in which the amount of binder present is between 36% and 38% by volume of the mouldable material.

8. A mouldable material according to claim 3 in which the polyethylene glycol has a molecular weight between 6000 and 7500 and melts at a temperature between 60° and 63° C.

9. A mouldable material according to claim 3 comprising a release agent.

10. A mouldable material according to claim 9 in which the release agent is tritolyl phosphate.

11. A mouldable material according to claim 9 in which the release agent is glycerol monostearate.

12. A mouldable material according to claim 8, comprising a release agent and between 8 and 30 parts by weight of polyolefin per 100 parts by weight of polyethylene glycol/polyolefin mixture.

13. A method of moulding ceramic articles which comprises shaping a body from mouldable material containing a ceramic composition in particle form mixed with a binder; said binder comprising a polyethylene glycol and at least one polyolefin, with the volume of binder being at least 102% of the ceramic material void volume at moulding temperature, and heating the shaped body to fire the ceramic composition and drive off the binder.

14. A method according to claim 13 wherein the body is shaped by pressure in a mould.

15. A method according to claim 13, in which the binder volume ranges from 102% to 115% of the void volume.

16. A method according to claim 15, in which the polyolefin content of the binder is polyethylene.

17. A method according to claim 16, in which the polyethylene glycol present has a molecular weight between 6000 and 7500 and melts between 60° C. and 63° C.

18. A method according to claim 17, in which the mouldable material contains a release agent.

References Cited by the Examiner

UNITED STATES PATENTS

| 2,593,507 | 4/1952 | Wainer | 264—63 XR |
| 2,939,199 | 6/1960 | Strivens | 264—63 |
| 2,966,719 | 1/1961 | Park | 264—63 XR |
| 3,020,619 | 2/1962 | Koch | 264—63 |

ROBERT F. WHITE, *Primary Examiner.*

J. A. FINLAYSON, *Assistant Examiner.* for instance, about 20 to about 50 or to about 100 and more.

A further object of the present invention is a process for curing the linear, high molecular weight polycarbonates according to Formula I, mentioned above.

When they are heated then cross-linking occurs due to trans-esterification whereby, according to the conditions, the corresponding monohydroxy components or their carbonates may be split off. Suitable curing temperatures are from about 150 to about 350° C.

The new polycarbonates can also be cured by the addition of di- or poly-hydroxy compounds or esters of such hydroxy compounds of low viscosity in amounts which are approximately equivalent to the number of ester groups contained as side chains in the polycarbonates followed by heating. For this purpose, there are again suitable aliphatic and aromatic dihydroxy compounds of the type already mentioned above, as well as polyhydroxy compounds such as trimethylol-ethane, -propane and -butane and pentaerythritol, as well as hydroxyl groups containing polyesters and polyethers or hydroxyl groups containing polymers.

Suitable esters of such polyhydroxy compounds are, for instance, acetates, propionates and ethyl or phenyl carbonates.

The hardening can be accelerated, if desired, by the addition of small amounts of basic or acidic transesterification catalysts, such as, metal, for instance, alkali metal or alkaline earth metal, zinc and titanium oxides, alcoholates, phenolates, hydrides, carbonates and acetates, boric acid, toluene-sulphonic acid and boron phosphate.

By variation of the dihydroxy-phenyl-carboxylic acid esters and of the other dihydroxy compounds which are used in the formation of the polycarbonates, and of the amounts in which they are used and possibly also by variation of the polyhydroxy compounds used for the cross-linking, and the cross-linking conditions, a large variety of end products can be obtained. Products can be obtained which, for example, show practically no swelling in methylene chloride, dioxane and benzene and whose softening temperatures are considerably above those of the non-cross-linked polycarbonates without their mechanical properties, such as their rigidity and tensile strength, deteriorating noticeably.

As in the case of known high molecular weight linear thermoplastic polycarbonates, the new non-cured polycarbonates are, as a rule, soluble in a series of organic solvents, such as methylene chloride, chloroform, ethylene chloride, dioxane, tetrahydrofurane, dimethyl formamide, benzene, ethyl acetate and butyl acetate. Therefore, they can be worked up via solutions or, since they are thermoplastic when not heated for too long a period of time, also via the melts, for example, with extruders or injection moulding machines to give formed bodies. Thus, foils, coatings and fibres, which becomes non-meltable and insoluble by subsequent heatings can be produced therefrom.

The fields of use of the new polycarbonates lie, for example, in the production of foils, threads, profiles, tubes, injection moulded bodies, lacquers and coatings in which a high softening range and a low solubility are required.

The following examples are given for the purpose of illustrating the present invention:

EXAMPLE 1

71.6 parts by weight gaseous phosgene are introduced into a mixture of 130.7 parts by weight 2,2-(4,4'-dihydroxy-diphenyl)-propane, 0.8 part by weight p-tertiary-butyl phenol, 330 parts by weight methylene chloride, 615 parts water and 156 parts by weight 45 percent sodium hydroxide solution at 25° C. in the course of 120 minutes and with stirring. Subsequently, 13.3 parts by weight bis(4-hydroxy-3-phenoxycarbonylphenyl)methane (5 mol percent of the total amount of dihydroxy compounds introduced), 0.24 part by weight triethylamine and 2 parts by weight sodium isobutylnaphthalene sulphonate are added thereto. After 20 minutes, the organic solution of the polycarbonate becomes highly viscous. It is washed neutral with water. After standing for several hours, the crystallised polycarbonate is dried in a vacuum at 100° C. The dried product has a relative viscosity of 1.706 measured in 0.5 percent solution in methylene chloride at 20° C., dissolves for example, in methylene chloride, chloroform, tetrahydrofurane and dioxane and swells in benzene and toluene. Melting range 200–210° C.

(a) Equal amounts of a solution of 8 parts by weight of this polycarbonate in 72 parts by weight anisole-diphenyl ether (1:1) are poured on to thin metal plates after the addition of 0.005 part by weight titanium tetrabutylate. After a short period of drying, the plates are maintained in an aerated drying cabinet which is heated to a definite temperature. Their behaviour with regard to dioxane is specifically tested, the amount of dioxane taken up in 30 minutes by the approximately 100μ thick film layer being measured:

| Test No. | Film Thickness in μ | Length of treatment in the drying chamber in minutes | Temperature of the drying chamber in ° C. | Polycarbonate content of film layer swollen in dioxane in percent |
|---|---|---|---|---|
| 1 | 100 | 30 | 270 | Soluble |
| 2 | 100 | 60 | 270 | 10.65 |
| 3 | 100 | 120 | 270 | 17.25 |

(b) A solution of 8 parts by weight of the polycarbonate in 72 parts by weight anisole-diphenyl ether (1:1) are poured in the form of films with the addition of 0.35 part by weight 2,2-(4,4'-dihydroxy-diphenyl)-propane and 0.005 part by weight titanium tetrabutylate in the manner described in (a), and heated to elevated temperatures.

| Test No. | Film Thickness in μ | Length of treatment in the drying chamber in minutes | Temperature of the drying chamber in ° C. | Polycarbonate content of film layer swollen in dioxane in percent |
|---|---|---|---|---|
| 1 | 100 | 30 | 270 | (¹) |
| 2 | 100 | 60 | 270 | 25.3 |
| 3 | 100 | 120 | 270 | 28.8 |
| 4² | 100 | 120 | 270 | Soluble |
| 5³ | 100 | 120 | 270 | Soluble |

¹ Swells considerably.
² 10 percent solution of a polycarbonate made from 2,2-(4,4'-dihydroxy-diphenyl)-propane in anisole-diphenyl ether (1:1).
³ As in footnote 2 but with the addition of 2,2-(4,4'-dihydroxy diphenyl)-propane and titanium tetrabutylate in the ratios given in the example.

(c) A solution as in (b) but with 2.83 parts by weight of a polycarbonate from 2,2-(4,4'-dihydroxy-diphenyl)-propane (molecular weight~21,000) with free hydroxyl end groups instead of 2,2-(4,4'-dihydroxy-diphenyl)-propane is poured into films as described in (a) and heated to elevated temperatures.

| Test No. | Film Thickness in μ | Length of treatment in the drying chamber in minutes | Temperature of the drying chamber in ° C. | Polycarbonate content of film layer swollen in dioxane in percent |
|---|---|---|---|---|
| 1 | 100 | 30 | 270 | 23.9 |
| 2 | 100 | 60 | 270 | 31.7 |
| 3 | 100 | 100 | 270 | 36.2 |

EXAMPLE 2

71.6 parts by weight phosgene are passed at 25° C. with stirring in the course of 2 hours into a mixture of 114 parts by weight 2,2-(4,4'-dihydroxy-diphenyl)-propane, 0.8 part by weight p-tertiary-butyl-phenol, 330 parts by weight methylene chloride, 615 parts by weight water and 177 parts by weight 45 percent sodium hydroxide solution. Subsequently, 24.5 parts by weight bis(4-hydroxy-3-phenoxycarbonylphenyl)methane (10 mol percent of total amount of dihydroxy compounds used), 0.24 part by weight triethylamine and 2 parts by weight sodium isobutyl-naphthalene sulphonate are introduced. After 15 minutes, the organic solution becomes highly viscous. It is worked up in the manner described in Example 1. The dried product has a relative viscosity of 1.7 measured in 0.5 percent solution in methylene chloride at 20° C., dissolves in, for example, methylene chloride, chloroform, tetrahydrofurane, dioxane and anisole and swells very considerably in benzene and toluene. Melting range 200–210° C.

10 parts by weight of this polycarbonate are dissolved in 90 parts by weight anisole-diphenyl ether (1:1) with the addition of 0.86 part by weight 2,2-(4,4'-dihydroxy-diphenyl)-propane and 0.064 part by weight basic zinc acetate. Films poured on metal plates are treated as described in Example 1.

| Test No. | Film Thickness in μ | Length of treatment in the drying chamber in minutes | Temperature of the drying chamber in ° C. | Polycarbonate content of film layer swollen in dioxane in percent |
| --- | --- | --- | --- | --- |
| 1 | 100 | 30 | 270 | 25.2 |
| 2 | 100 | 60 | 270 | 33.8 |
| 3 | 100 | 120 | 270 | 39.9 |
| 4 | 40 | 1 | 350 | 60.7 |
| 5 | 40 | 2 | 350 | 82.8 |
| 6 | 40 | 3 | 350 | (¹) |

¹ Practically no take up of solvent.

Test No. 3 was carried out at 220° C. and Test No. 6 is non-scratchable.

EXAMPLE 3

71.6 parts by weight phosgene are passed at 25° C. with stirring in the course of 2 hours into a mixture of 114 parts by weight 2,2-(4,4'-dihydroxy-diphenyl)-propane, 0.8 part by weight p-tertiary-butyl-phenol, 330 parts by weight methylene chloride, 615 parts by weight water and 177 parts by weight 45 percent sodium hydroxide solution. Subsequently, 10.05 parts by weight 3,5-dihydroxy benzoic acid ethyl ester (10 mol percent of the total amount of dihydroxy compounds introduced), 0.24 part by weight triethylamine and 2 parts by weight sodium isobutyl naphthalene sulphonate are introduced. In 30 minutes the organic solution becomes highly viscous. It is worked up in the manner described in Example 2. The dried polycarbonate has a relative viscosity of 1.580 measured in 0.5 percent solution in methylene chloride at 20° C. and dissolves, for example, in methylene chloride, chloroform, ethylene chloride, tetrahydrofurane and dioxane. Melting range 200–210° C.

A solution of 10 parts by weight of this polycarbonate in 92 parts by weight anisole-diphenyl ether (1:1) is painted onto sheet metal after the addition of 0.36 part by weight octaethylene glycol and 0.064 part by weight basic zinc acetate and treated as in Example 1.

| Test No. | Film Thickness in μ | Length of treatment in the drying chamber in minutes | Temperature of the drying chamber in ° C. | Polycarbonate content of film layer swollen in dioxane in percent |
| --- | --- | --- | --- | --- |
| 1 | 100 | 30 | 270 | Soluble |
| 2 | 100 | 60 | 270 | (¹) |
| 3 | 100 | 120 | 270 | 44.7 |

¹ Considerably swollen.

EXAMPLE 4

71.6 parts by weight phosgene are passed at 25° C. with stirring in the course of 2 hours into a mixture of 130.7 parts by weight 2,2-(4,4'-dihydroxy-diphenyl)-propane, 0.8 part by weight p-tertiary-butyl-phenol, 330 parts by weight methylene chloride, 615 parts by weight water and 156 parts by weight 45 percent sodium hydroxide solution. Subsequently, 10.4 parts by weight bis(4-hydroxy-3-ethoxycarbonylphenyl)methane (5 mol percent of the total amount of dihydroxy compounds used), 0.24 part by weight triethylamine and 2 parts by weight sodium isobutyl naphthalene sulphonate are added. In 30 minutes the organic solution becomes viscous. It is worked up in the manner described in Example 1. The dried polycarbonate has a relative viscosity of 1.440 measured in 0.5 percent solution in methylene chloride at 20° C. and dissolves, for example, in methylene chloride, chloroform, tetrahydrofurane and dioxane. Melting range 195–205° C.

Films are poured on metal plates from a solution of 10 parts by weight of this product in 90 parts by weight anisole-diphenyl ether (1:1) with the addition of 0.717 part by weight 2,2-(4,4'-dihydroxy-ethoxy-diphenyl)-propane and 0.010 part by weight titanium tetrabutylate, and heated.

| Test No. | Film Thickness in μ | Length of treatment in the drying chamber in minutes | Temperature of the drying chamber in ° C. | Polycarbonate content of film layer swollen in dioxane in percent |
| --- | --- | --- | --- | --- |
| 1 | 100 | 30 | 270 | Dissolves |
| 2 | 100 | 60 | 270 | 18.0 |
| 3 | 100 | 120 | 270 | 31.1 |

The bis-(hydroxy-phenyl carboxylic acid ester)-alkanes of the general Formula X, mentioned above, and the process for producing them are new. Therefore the present invention is also concerned with bis-(hydroxyaryl-carboxylic acid ester)-alkanes, and with a process for the production thereof.

It is known to condense hydroxyaryl-carboxylic acids with aldehydes or ketones in the presence of acidic condensation agents to give dihydroxy-dicarboxydiaryl alkanes. Thus, for example, by the reaction of formaldehyde with salicylic acid there is obtained bis-(4-hydroxy-3-carboxyphenyl)-methane. It is difficult to esterify such acids. On the other hand, hydroxy-aryl-carboxylic acid esters have already been reacted in acidic media with carbonyl compounds. Thus, for example, in Example 4 of German Patent No. 364,044, the condensation of salicylic acid diphenly ester with formaldehyde, using sulphuric acid as condensation agent, by boiling the reaction mixture under reflux, has already been described. Nevertheless, according to this process resinous products are obtained which can be used as additives for zapon varnish. From this discovery it is to be assumed that under the influence of the acid not only the condensation between the formaldehyde and the benzene nuclei but also a saponification or trans-esterification of the ester groups, and therewith further condensations, take place.

We have now found that by maintaining suitable conditions it is possible, in the case of the condensation of hydroxy-aryl-carboxylic acid esters of the general Formula XI

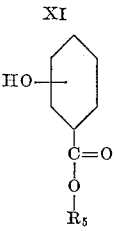

with carbonyl compounds in the presence of acidic catalysts, substantially to suppress the saponification of the ester groups and also the subsequent reactions so that definitely monomeric bis-(hydroxyaryl carboxylic acid ester)-alkanes can be obtained in good yields. Thus, we have found that high yields of these materials are obtained when lower reaction temperatures are employed but the reaction velocity falls off considerably with decreasing temperature. Furthermore, however, with a definite reaction temperature there is obtained a maximal yield after a definite period of reaction and thus after a definite conversion.

The following table shows, by way of example, how the reaction of salicylic acid phenyl ester with paraformaldehyde in the presence of concentrated sulphuric acid as condensation agent and of glacial acetic acid as solvent gives different yields of the diphenylester of methylene disalicylic acid, which can be designated systematically as bis(4-hydroxy-3-phenoxycarbonylphenyl)-methane depending on the reaction temperature and the period of reaction employed:

| Temperature, °C. | Reaction time in minutes | Bis(4-hydroxy-3-phenoxycarbonyl-phenyl) methane, percent of theory |
|---|---|---|
| 60 | 120 | 22.8 |
|  | 300 | 30.4 |
|  | 480 | 36.8 |
|  | 600 | 38.2 |
|  | 720 | 39.4 |
|  | 840 | 32.0 |
| 70 | 30 | 22.8 |
|  | 60 | 27.9 |
|  | 90 | 30.4 |
|  | 120 | 31.8 |
|  | 210 | 39.4 |
|  | 270 | 38.7 |
|  | 390 | 30.4 |
| 80 | 30 | 10.8 |
|  | 60 | 26.7 |
|  | 90 | 30.4 |
|  | 150 | 29.2 |
|  | 240 | 20.4 |
| 90 | 10 | 8.9 |
|  | 20 | 19.0 |
|  | 30 | 9.5 |
|  | 60 | 7.0 |
|  | 240 | 0.6 |

Thus, at a reaction temperature of 60° C. and after 12 hours a maximal yield of 39.4 percent is obtained, at a reaction temperature of 70° C. and after 3½ hours a maximal yield of 39.4 percent, at a reaction temperature of 80° C. after 1½ hours a maximal yield of 30.4 percent and at a reaction temperature of 90° C. after 20 minutes a maximal yield of 19 percent.

For each pair of reaction components and their concentration and for the nature and amount of the catalysts employed, the most favourable optimal reaction temperatures and reaction times and, dependent thereon, the maximal yields of the corrseponding bis-(hydroxy-arylcarboxylic acid ester)-alkanes, can be easily determined.

Thus, the process according to the invention for the production of bis-(hydroxy-aryl-carboxylic acid ester)-alkanes according to Formula X, mentioned above, consists in the hydroxy-aryl-carboxylic acid esters according to Formula XI, mentioned above, are reacted with carbonyl compounds in the presence of acidic condensation agents at optimal reaction temperatures for the optimal reaction time dependent thereon.

Suitable hydroxy-aryl-carboxylic acid esters for the process are, for example, the salicylic acid methyl, ethyl, propyl, isopropyl, butyl, isobutyl, pentyl, hexyl, cyclopentyl, cyclohexyl and phenyl esters, the corresponding esters of p-hydroxybenzoic acid, o-cresotic acid and p-cresotic acid.

As carbonyl compounds there can be used, for example, formaldehyde or paraformaldehyde, acetaldehyde, propionaldehyde, butyraldehyde, benzaldehyde, acetone, methyl ethyl ketone, diethyl ketone, methyl propyl ketone, ethyl propyl ketone, dipropyl ketone, acetophenone, ethyl phenyl ketone or cyclohexanone.

As acid condensation agents there come mainly into question hydrogen chloride and sulphuric acid.

The condensation of the esters with the carbonyl compounds can, if desired, be carried out in the presence of solvents which do not react under the reaction conditions. For this purpose there may be used, for example, benzene, methylene chloride or glacial acetic acid.

In the following example there is described, in more detail, how the production of bis(4-hydroxy-3-phenoxycarbonylphenyl)methane can be carried out according to the above table under optimal conditions. In this case, a reaction temperature of 60° C. was chosen at which the optimal reaction time amounts to 12 hours.

EXAMPLE 5

27.6 parts by weight concentrated sulphuric acid are added dropwise with stirring at 30° C. in 10 minutes to a mixture of 214 parts by weight salicylic acid phenyl ester, 50 parts by weight glacial acetic acid and 15 parts by weight paraformaldehyde. Subsequently, the temperature is increased to 60° C. in 10 minutes, with stirring, and maintained at this temperature for 72 hours. After cooling to room temperature, it is mixed with 200 parts by volume ether and 100 parts by volume water. After standing overnight at room temperature, the crystals which separate out are filtered off with suction, washed with ether, then with water and dried in a vacuum at 80° C. Yield 87 parts by weight, melting point 136–139° C. After recrystallisation from di-n-butyl ether or glacial acetic acid the melting point is 142–144° C.

EXAMPLE 6

Into a mixture of 1216 grams salicylic acid methyl ester, 400 grams glacial acetic acid and 126 grams paraformaldehyde there are dropped during 30 minutes at 30° C. 120 cm.³ concentrated sulphuric acid. During about 10 minutes the mixture is warmed to 70° C. and held at this temperature for 2 hours. After standing overnight the mixture is substantially crystallized. It is stirred with 300 cm.³ ether and 300 cm.³ water. After filtration the filtering residue is washed neutral with water, sodium bicarbonate solution and again water and then dried at 70° C. under vacuum. One obtains 636 grams methylene di-salicylic acid dimethyl ester with the melting point 105–107° C. After recrystallisation from ethanol in an amount of 5 times the melting point is 107–109° C.

EXAMPLE 7

Into a mixture of 664 grams salicylic acid ethyl ester, 200 grams glacial acetic acid and 63 grams paraformaldehyde there are dropped during 20 minutes at 30° C. 60 cm.³ concentrated sulphuric acid. Then, during about 10 minutes, the mixture is warmed to 70° C. and held for 2 hours at this temperature under stirring. After cooling and the addition of 330 cm.³ ligroin the mixture is allowed to stand over night, then stirred with 400 cm.³ water and filtered. The filtering residue is again stirred with 330 cm.³ ligroin and then washed neutral with water, sodium bicarbonate solution and again water and then dried at 70° C. under vacuum. One obtains 361 grams methylene di-salicylic acid diethyl ester with the melting point 103–105° C. After recrystallisation in the double amount of ligroin the melting point is 108–110° C.

We claim:
1. A curable, linear, high molecular weight polycarbonate having a chain structure of the formula

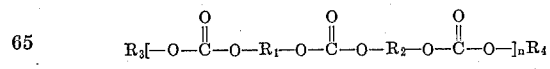

wherein
$R_1$ and $R_2$ are divalent radicals selected from the group consisting of alkylene, cycloalkylene, bis-alkylene phenyl, bis-(alkyleneoxy)-phenyl, and arylene;
$R_3$ and $R_4$ are monovalent radicals selected from the group consisting of alkyl, cycloalkyl, aralkyl, aryl, alkaryl, hydroxy alkyl, hydroxy cycloalkyl, hydroxy aralkyl, mono-oxalkylated hydroxy aryl, hydroxy aryl, and hydroxy alkaryl, at least part of (a) $R_1$ and $R_2$ and (b)

$R_3$ and $R_4$ being one of the radicals selected from the group consisting of

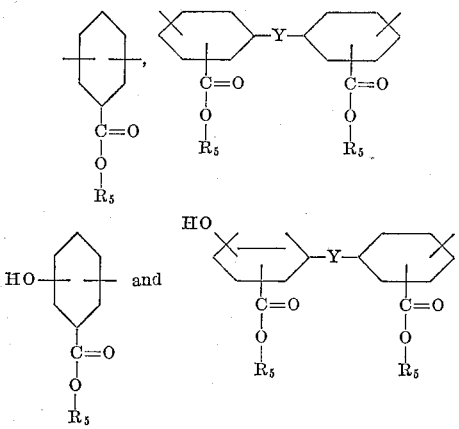

respectively
wherein $R_5$ is a monovalent radical selected from the group consisting of methyl, ethyl, propyl, isopropyl, butyl, isobutyl, pentyl, and phenyl;
Y is lower alkylidene,
the ester groups forming side-chains, and $n$ is a whole number greater than 5.

2. Curable, linear, high molecular weight polycarbonates according to claim 1, wherein at least part of $R_1$ and $R_2$ is a diphenylene alkane radical.

3. Curable, linear, high molecular weight polycarbonates according to claim 1, wherein at least apart of $R_1$ and $R_2$ is a diphenylene ether radical.

4. Curable, linear, high molecular weight polycarbonates according to claim 1, wherein at least part of $R_1$ and $R_2$ is a diphenylene sulphide radical.

5. Curable, linear, high molecular weight polycarbonates according to claim 1, wherein at least part of $R_1$ and $R_2$ is a diphenylene sulphone radical.

6. Curable, linear, high molecular weight polycarbonates according to claim 1, wherein at least part of $R_1$ and $R_2$ is a diphenylene sulphoxide radical.

7. Curable, linear, high molecular weight polycarbonates according to claim 1, wherein at least part of $R_3$ and $R_4$ is a monohydroxy diphenylene alkane radical.

8. Curable, linear, high molecular weight polycarbonates according to claim 1, wherein at least part of $R_3$ and $R_4$ is a monohydroxy diphenylene ether radical.

9. Curable, linear, high molecular weight polycarbonates according to claim 1, wherein at least part of $R_3$ and $R_4$ is a monohydroxy diphenylene sulphide radical.

10. Curable, linear, high molecular weight polycarbonates according to claim 1, wherein at least part of $R_3$ and $R_4$ is a monohydroxy diphenylene sulphone radical.

11. Curable, linear, high molecular weight polycarbonates according to claim 1, wherein at least part of $R_3$ and $R_4$ is a monohydroxy diphenylene sulphoxide radical.

12. Cured, high molecular weight polycarbonates obtained by heating a curable, linear, high molecular weight polycarbonate of the group defined in claim 1.

13. Cured, high molecular weight polycarbonates obtained by heating a curable, linear, high molecular weight polycarbonate of the group defined in claim 1 under the addition of a compound selected from the group consisting of organic dihydroxy compounds, organic polyhydroxy compounds and esters of polyhydroxy compounds having low viscosity.

14. Cured, high molecular weight polycarbonates obtained by heating a curable, linear, high molecular weight polycarbonate of the group defined in claim 1 under the addition of a hydroxyl group containing polyester.

15. Cured, high molecular weight polycarbonates obtained by heating a curable, linear, high molecular weight polycarbonate of the group defined in claim 1 under the addition of a transesterification catalyst selected from the group consisting of metal oxides, alcoholates, phenolates, hydrates, carbonates and acetates and boric acid, toluene sulphonic acid and boron phosphate.

16. Process for the production of curable, linear, high molecular weight polycarbonates of claim 1, which comprises reacting molecular amounts of organic dihydroxy compounds selected from the group consisting of glycols, dihydroxy cycloalkanes, bisoxalkylated aromatic dihydroxy compounds and derivatives of aromatic compounds having two hydroxyl groups directly attached to the aromatic nucleus; and a carbonic acid derivative selected from the group consisting of phosgene and bis-chlorocarbonic acid esters of the dihydroxy compounds, in the presence of a slight excess (1) of the dihydroxy compounds as chain breakers, (2) of an acid binding agent selected from the group consisting of an alkali metal and an alkaline earth metal hydroxide, and (3) of a tertiary amine as a catalyst; effecting said reaction at a temperature range from room temperature to about 50° C., at least part of said dihydroxy compounds being a dihydric phenol selected from the group consisting of

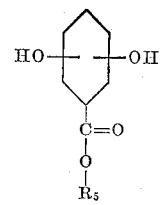

and

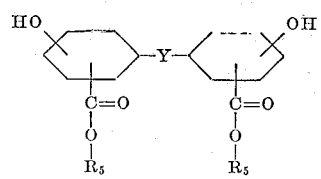

wherein $R_5$ is a monovalent radical selected from the group consisting of methyl, ethyl, propyl, isopropyl, butyl, isobutyl, pentyl, cyclopentyl, cyclohexyl, and phenyl; and Y is lower alkylidene.

References Cited by the Examiner
UNITED STATES PATENTS

| | | | |
|---|---|---|---|
| 2,374,949 | 5/1945 | Niederl | 260—473 |
| 2,789,966 | 4/1957 | Reynolds et al. | 260—47 |
| 2,789,967 | 4/1957 | Reynolds et al. | 260—47 |
| 2,807,653 | 9/1957 | Filbey | 260—619 |
| 2,822,404 | 2/1958 | Ambelang | 260—619 |
| 2,933,520 | 4/1960 | Bader | 260—473 |
| 2,933,521 | 4/1960 | Greenlee | 260—473 |
| 2,950,266 | 8/1960 | Goldblum | 260—47 X |
| 3,035,091 | 5/1962 | Wygant | 260—619 |
| 3,132,118 | 5/1964 | Butterworth et al. | 260—47 X |

WILLIAM H. SHORT, *Primary Examiner.*

HAROLD N. BURSTEIN, JOSEPH R. LIBERMAN, J. C. MARTIN, *Assistant Examiners.*